United States Patent [19]

Glennon et al.

[11] Patent Number: 4,477,765

[45] Date of Patent: Oct. 16, 1984

[54] VOLTAGE REGULATOR

[75] Inventors: Timothy F. Glennon; William J. Peterson, both of Rockford; James B. Thom, Freeport, all of Ill.

[73] Assignee: Sundstrand Corporation, Rockford, Ill.

[21] Appl. No.: 528,729

[22] Filed: Sep. 1, 1983

Related U.S. Application Data

[60] Division of Ser. No. 189,776, Sep. 22, 1980, Pat. No. 4,403,292, and a continuation of Ser. No. 43,804, May 30, 1979, abandoned.

[51] Int. Cl.³ ............................ H02P 9/00; H02P 9/30
[52] U.S. Cl. .......................................... 322/20; 307/84; 322/25; 322/27; 361/20
[58] Field of Search ............... 322/25, 27, 28, 19, 322/20, 99, 100; 361/20, 21; 307/84

[56] References Cited

U.S. PATENT DOCUMENTS

| | | | |
|---|---|---|---|
| 4,044,296 | 8/1977 | Dhyanchand et al. | 322/27 X |
| 4,406,984 | 9/1983 | Karlicek | 322/25 X |
| 4,409,635 | 10/1983 | Kraus | 307/84 X |
| 4,410,848 | 10/1983 | Frierdich | 361/20 X |

*Primary Examiner*—R. J. Hickey
*Attorney, Agent, or Firm*—Wood, Dalton, Phillips, Mason & Rowe

[57] ABSTRACT

A motor driven generator has a generator control unit which incorporates a programmed microprocessor to control generator operation. A generator voltage regulator utilizes the microprocessor of the generator control unit to develop an error voltage which is added to the average phase voltage of the generator, controlling the generator field current. In the event of a phase failure the generator control unit senses an abnormally high phase voltage condition, disables the average phase voltage circuit. In the event of an abnormal difference between the high and low phase voltages, the gain of the error signal circuit is reduced.

5 Claims, 5 Drawing Figures

4,477,765

VOLTAGE REGULATOR

RELATED APPLICATIONS

This application is a division of Ejzak et al. U.S. application Ser. No. 189,776, filed Sept. 22, 1980, now U.S. Pat. No. 4,403,292 a continuation of Ser. No. 43,804, filed May 30, 1979, now abandoned.

DESCRIPTION

TECHNICAL FIELD

This application relates to a voltage regulator for a multi-phase generator.

BACKGROUND OF THE INVENTION

In a typical multi-engine aircraft electrical system for which the invention is particularly suited, each engine drives a generator through a constant speed drive. Each of the engine driven generators powers a set of load circuits and the load circuits may be interconnected through an electrical distribution bus. An auxiliary power unit drives an auxiliary generator to supplement the engine driven generators in the event of an engine or generator failure. The auxiliary power unit is also used to provide electric power with the aircraft on the ground when the engines are shut down and an external power source is not readily available.

A generator control unit (GCU) for each of the generators monitors the electrical condition of the associated generator and conditions of the mechanical drive to the generator. A bus power control unit (BPCU) monitors power distribution throughout the system and the condition of the generators, and controls loads and bus tie breakers which connect the electrical distribution bus between the generators, loads and the auxiliary generator. One or both loads are powered by one of the available generators. Two generators are not, however, connected in parallel. The control units have in the past coordinated interlock information using multiple hard wired circuits.

SUMMARY OF THE INVENTION

In accordance with the invention of the parent application, the generator control units and the bus power control unit utilize integrated circuit microprocessors which have several advantages including functional flexibility and improved reliability.

One feature of the invention is that the generator control unit microprocessor responds to generator circuit conditions and provides error and control signal for the generator voltage regulator.

Another feature is the provision of a voltage regulator in which an average of the generator phase voltages is corrected by an error signal to control the generator field current source and having means for sensing an abnormally high phase voltage to disable the summing means and operate the field current source from the error signal.

Yet another feature is the provision of means for subtracting the low phase voltage for the high phase voltage and providing a control signal when the differences exceed a selected level. The gain of the voltage error circuit is reduced upon occurrence of the control signal.

Further features and advantages of the invention will readily be apparent from the following specification and from the drawings.

The electrical generation and distribution system are illustrated and described herein as embodied in a system for a two engine aircraft with an auxiliary power unit. It will be understood that features of the control may be utilized with other aircraft electrical generation and distribution systems and with electrical generation and distribution systems of other kinds.

Figure 1:
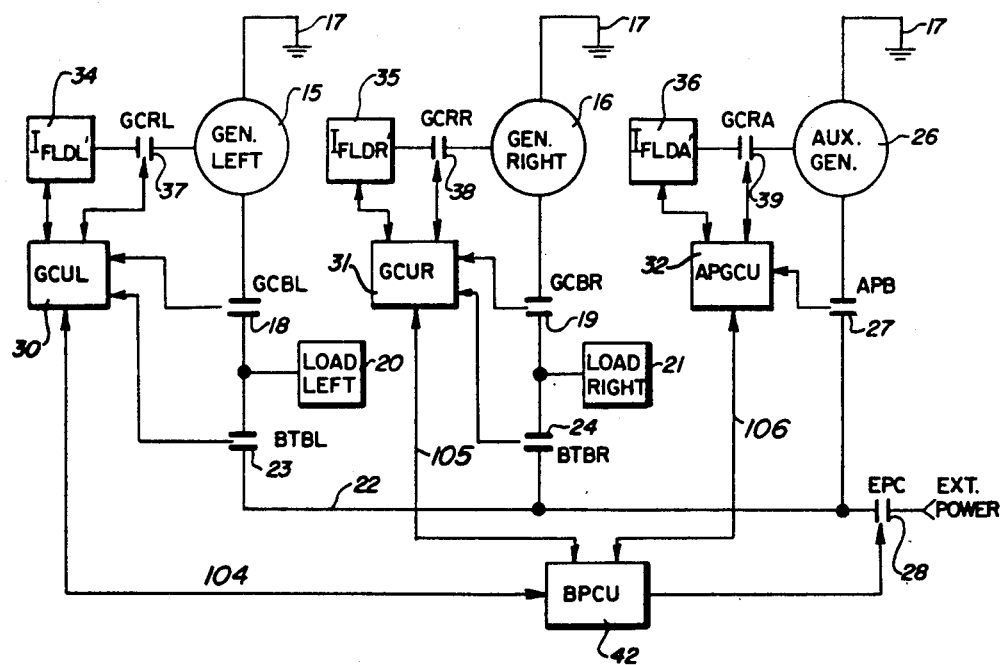
FIG. 1 is a simplified system schematic.

The simplified system illustrated in FIG. 1 utilizes a single line to indicate what may be multiple connections between elements. A pair of engine driven generators 15, 16 are designated GEN LEFT and GEN RIGHT. Both generators have outputs referenced to a common return or ground 17 and connected through output circuits including generator circuit breakers 18, 19, designated GCBL and GCBR, with loads 10, 21 respectively. An electrical distribution bus 22 may be selectively connected with the generator output circuits and loads 20, 21 through bus tie breakers 23, 24 designated BTBL and BTBR.

An auxiliary generator 26 also has an output referenced to ground 17 and connected through an output circuit including auxiliary power breaker 27 (APB) with electrical distribution bus 22. Further details of an auxiliary power unit which includes the auxiliary power generator may be found in Glennon et al. U.S. patent application Ser. No. 18,739, filed Mar. 8, 1979, now abandoned in favor of continuation application Ser. No. 179,025 filed Aug. 18, 1980, and assigned to the assignee of this invention.

An external power source (not shown) may be connected with the electrical system when the aircraft is on the ground through a contactor 28, designated EPC.

The aircraft electrical system is typically a three phase system operating at 400 Hertz with a four wire distribution system. Accordingly, the single line connections and single contactors described above represent four conductors and three pole relays, the neutral remaining unbroken.

Each of the generators has a control unit 30, 31 and 32. The generator control unit is designated GCU with that for the left generator being GCUL, that for the right generator being GCUR, and that of the auxiliary generator being APGCU. As will appear in more detail below, generator control units 30, 31 and 32 monitor the operating conditions of the associated generators and control the operation of field current sources 34, 35 and 36 and generator control relays 37, 38 and 39, respectively. The field current sources are designated $I_{FLD}$ and the generator control relays are designated GCR. The field current source and generator control relay may physically be a part of the control unit.

The arrowheads at each end of the lines interconnecting the GCU with the associated $I_{FLD}$ and GCR indicate that information for status and control is transmitted in both directions. The single headed line between the generator circuit and bus tie breakers (as 18, 27) and the GCU (as 30) indicate that breaker status or condition information is an input to the GCU. A similar drawing convention is followed in other figures.

A bus power control unit 42 (BPCU) is connected for transmission of system condition information and interlocks with each GCU, and, as will appear in more detail below, controls the operation of the breakers to maintain optimal distribution of energy from the sources available to loads 20, 21. Each of the control units utilizes a microprocessor to provide for the collection and organization of information concerning generator operation and circuit conditions and for the establishment and distribution of appropriate control signals.

Figure 2:
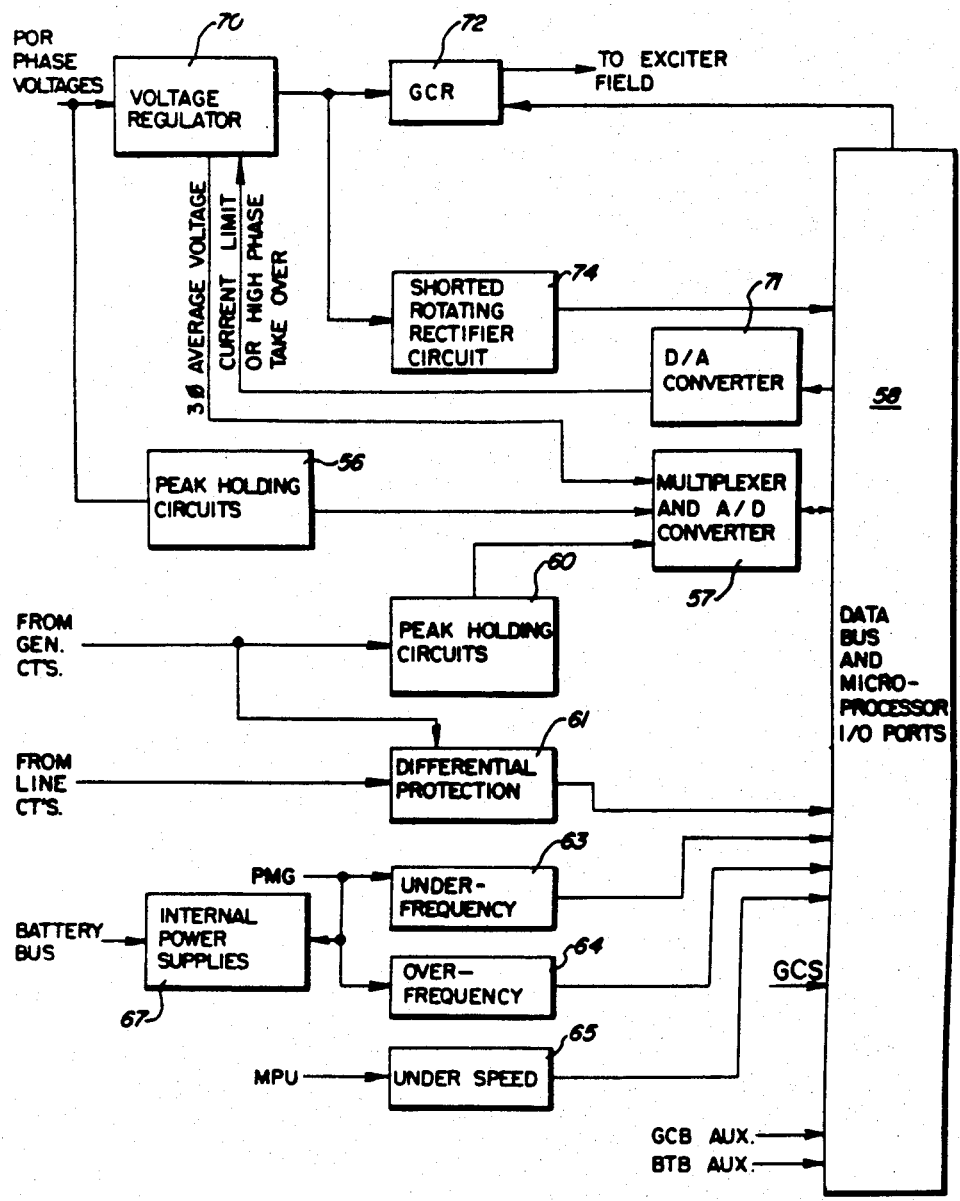
FIG. 2 is a simplified block diagram of a portion of the generator control unit.

FIG. 2 illustrated in simplified block form the principal generator and distribution system inputs to the generator control unit GCU. The microcomputer may use an Intel Corporation type 8085 microprocessor. The generator output voltage for each of the three phases is derived at a point of regulation (POR), which may be a terminal of the generator circuit breaker GCB. The phase voltages are connected through peak holding circuits 56 to an analog signal multiplexer and analog to digital converter 57. The phase voltages, along with other inputs to be described, are selected sequentially by the multiplexer, converter to digital information and coupled to the microprocessor through the data bus and input-output (I/O) ports 58.

Phase currents are sensed by current transformers CTS (not shown in FIG. 3) and coupled through peak holding circuits 60 to the multiplexer and A/D converter 57. Distribution circuit line currents are also sensed by current transformers and connected along with the generator current signals to a differential current comparator 61 which provides an appropriate input to the microprocessor in the event an excessive current unbalance occurs.

The output of the permanent magnet generator PMG is sensed with under and over frequency detectors 63, 64 which, if the frequency is outside selected limits, provide signals to the microprocessor. Alternatively, the PMG output may be converted to a digital signal and connected directly with the microprocessor. A magnetic pickup unit MPU associated with the constant speed drive 46 provides a signal to underspeed detector circuit 65 which also provides an information input to the microprocessor. Other generator condition signals are provided from a generator control switch GCS, a cockpit control enabling operation of the generator control relay when the engine is started, and from auxiliary contacts of the generator circuit breaker GCB and bus tie breaker BTB.

The output of the permanent magnet generator PMG is also utilized for the GCU internal power supplied 67. The power supplies are energized from the aircraft battery bus when a generator is not operating.

The generator phase voltages from the point of regulation are connected with voltage regulator 70 in which, as will appear in more detail below, a three phase average voltage is derived and coupled through multiplexer and A/D converter 57 to the microprocessor. A voltage error signal developed by the microprocessor is coupled out through digital to analog (D/A) converter 71 to the voltage regulator. A regulated field current for the exciter is connected through the generator control relay 72 to the field winding of exciter 49. A low voltage monitor 73 (FIG. 5) and a rotating rectifier short circuit detector 74 connected with the field circuit provide additional inputs to the microprocessor.

The phase currents at various points in the system are sensed, as by current transformers, and coupled to the generator control units and the bus power control unit. These generator and system condition inputs to the control units afford a basis for control functions and provide redundant information used in checking system operation.

Figure 3:
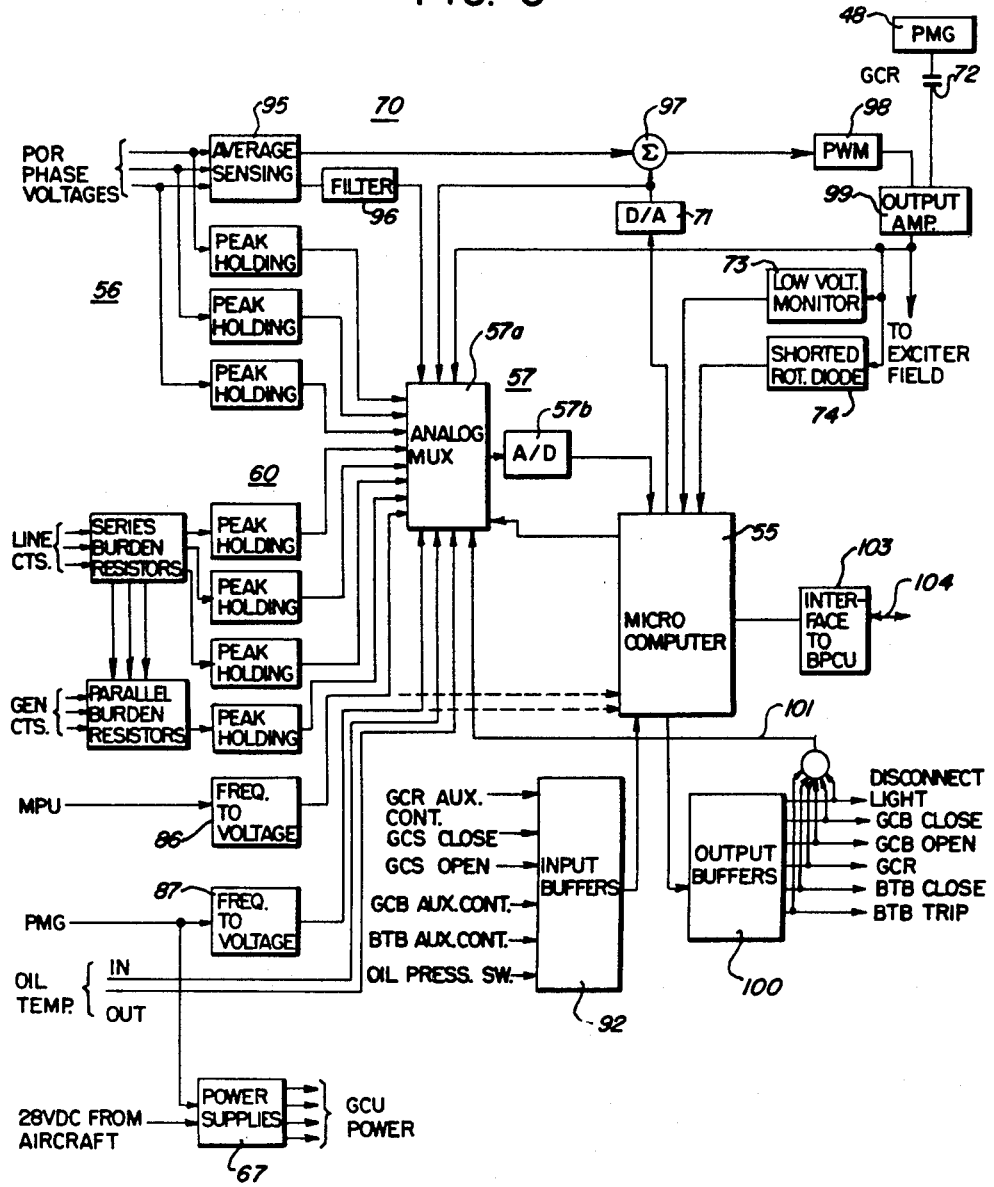
FIG. 3 is a block diagram similar to FIG. 1 with additional detail.

FIG. 3 shows in somewhat more detail the inputs to and the outputs of the generator control unit. To the extent that it is practical, reference numerals from FIG. 3 are used in FIG. 5. The various analog signals representing generator conditions are coupled through analog multiplexer 57a and A/D converter 57b to microcomputer 55. These include the point of regulation phase voltages sensed by peak holding circuits 56 and the line and generator currents from the respective current transformers sensed by peak holding circuits 60. A speed signal for the constant speed drive 46 from the magetic pickup is connected through a frequency to voltage converter 86. Similarly the speed signal from the permanent magnet generator 48 is connected through a frequency to voltage converter 87. The temperature of oil used in the constant speed drive and for cooling the generator is sensed at both the inlet and outlet of the IDG housing. Analog temperature signals provide additional multiplexer inputs. Under control of the microcomputer, analog multiplexer 57a sequentially scans the generator condition inputs and the signals are connected through analog to digital converter 57b to an input of the microcomputer. The MPU and PMG speed signals may be converted directly to digital form and coupled to microcomputer 55 as indicated in broken lines.

Digital inputs, e.g., switches, are connected through input buffers 92. These inputs include auxiliary contacts on the generator control relay GCR, generator circuit breaker GCB and bus tie breaker BTB. Generator control switch GCS, a cockpit control, provides discrete input signals in both the closed or the open position. An oil pressure switch provides a further input indicating the availability of oil to operate the constant speed drive and to cool the generator.

With particular reference to the voltage regulator portion of the control unit indicated generally at 70, the average phase voltage of the generator is developed in average sensing circuit 95, and connected through filter 96 with the analog multiplexer. The error signal described in connection with FIG. 3 is connected through digital to analog converter 71 to summing junction 97 where it is added to the average phase voltage and the sum connected with a pulse width modulator (PWM) 98 that drives output amplifier 99 providing field current to the exciter field winding. The field circuit power is supplied by the permanent magnet generator through the generator control relay 72. The outputs of digital to analog converter 71 and of output amplifier 99 are connected with inputs of the analog multiplexer 57a and are compared by microprocessor 55 with the desired quantities as a check on the operation of the system. Shorted rotating diode circuit 74 senses a diode failure and provides an input to the microprocessor to operate the generator control relay 72.

Outputs from microcomputer 55 are connected through output buffers 100. The principal outputs include signals controlling operation of generator control relay GCR and closing or opening the breakers GCB and BTB. A disconnect light output provides a visual indication in the cockpit that a condition excists in which the generator should be disconnected. As an additional check on system operation, the output buffer signals are connected through a multi-conductor connection 101 with analog signal input multiplexer 57a.

Communication between the microcomputer 55 and the bus power control unit is provided through an interface 103 and a serial data link 104 which may comprise a two wire twisted pair. As data is communicated between the control units in a serial fashion, only a two wire line is needed even though the data may represent many different circuit conditions or control signals. In the three generator system illustrated, the bus power control unit may have a four millisecond cycle period. During each cycle system information is exchanged and verified by communication over the data link.

An internal clock (not shown) provides timing for the microprocessor, the multiplexer and demultiplexer and other timer circuits. Synchronizing signals transmitted over the data bus 104 from the bus power control unit coordinate operation of the system control units. The clock signals are counted to establish accurate timing periods which may have a common reference or starting time.

Figure 4:
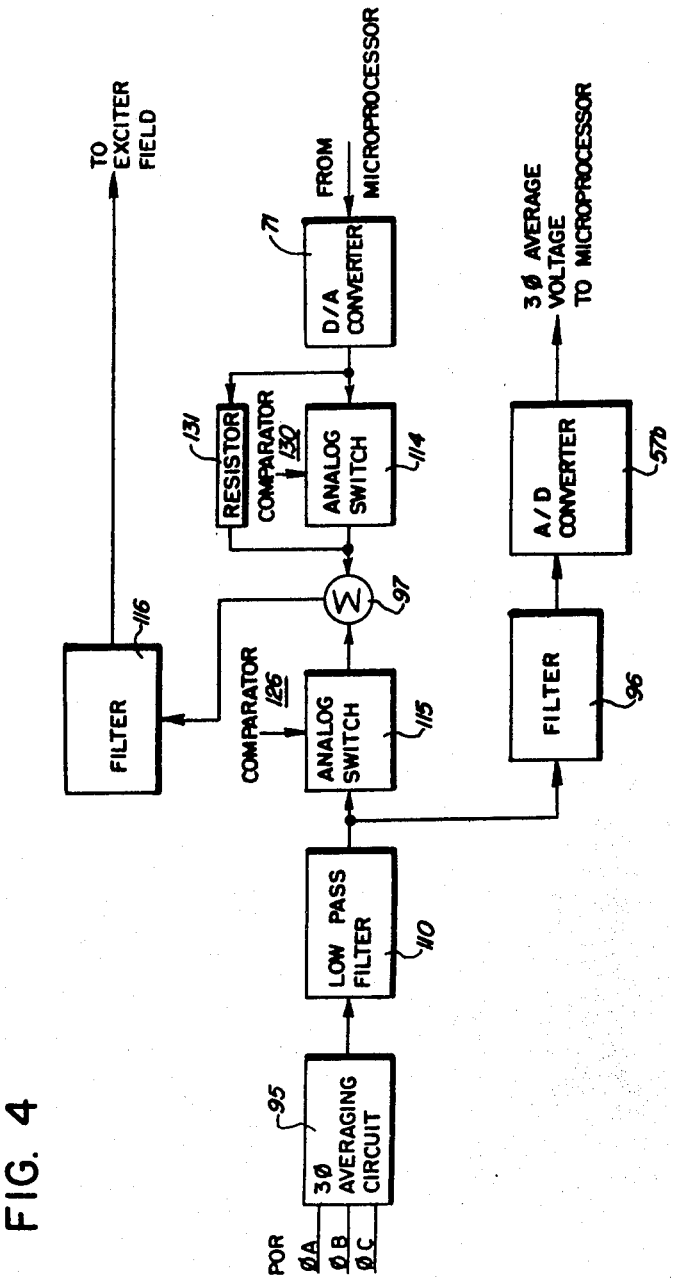
FIG. 4 is a block diagram of the generator voltage regulator.
Figure 5:
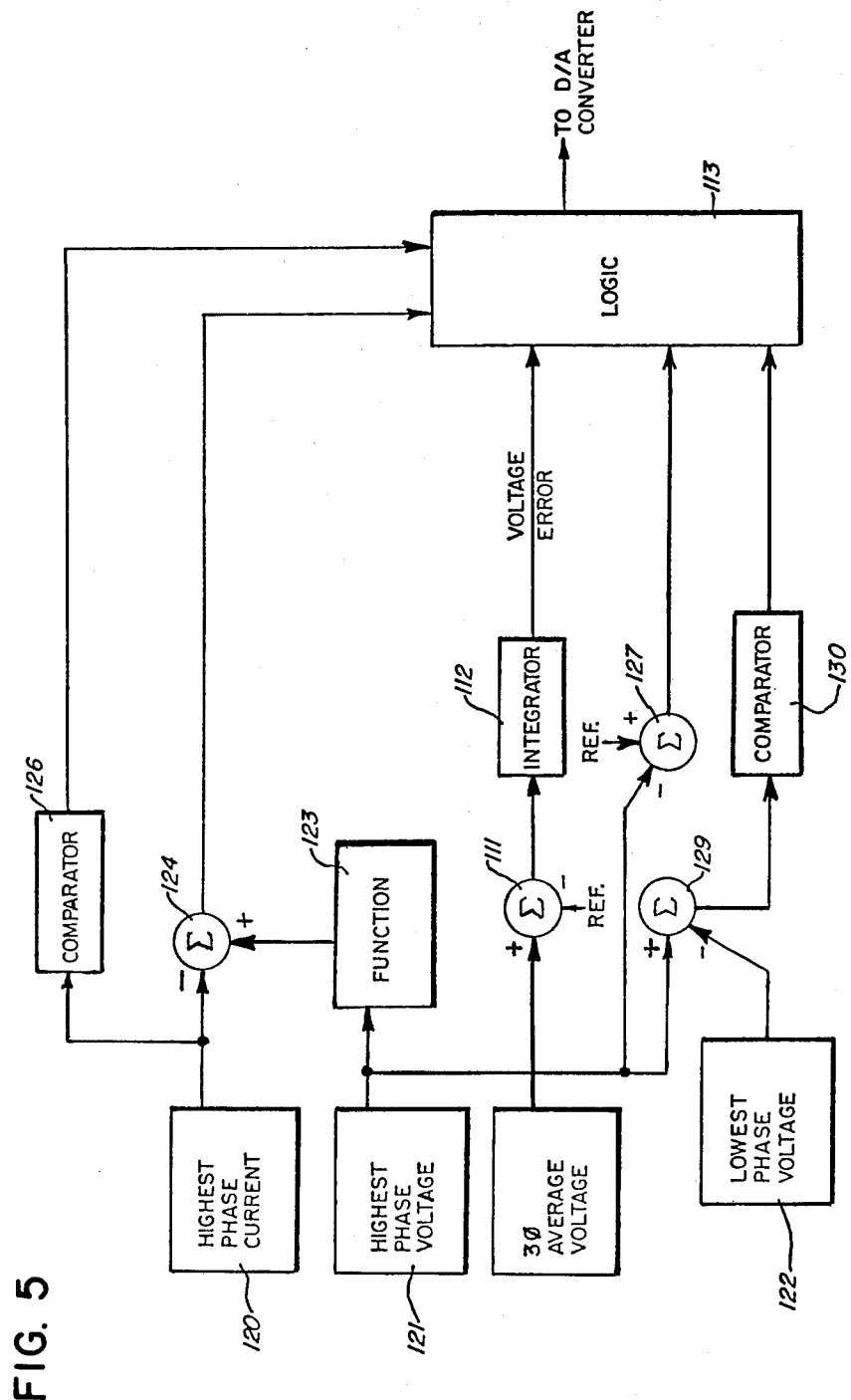
FIG. 5 is a block diagram illustrating the microprocessor functions related to the voltage regulator.

FIGS. 4 and 5 illustrate in more detail the combination of analog and microprocessor signal handling in the voltage regulator. Referring first to FIG. 4, the three phase voltages $\phi A$, $\phi B$ and $\phi C$ are connected with averaging circuit 95 and the analog average signal is connected through a low pass filter 110, filter 96 and analog to digital converter 57b to the microprocessor. FIG. 5 illustrates in functional block form the voltage regulator related signal paths in the microprocessor. For normal generator regulation, the three phase average voltage is compared with a reference at summing junction 111. The difference is integrated at 112 providing a voltage error connected through logic circuit 113, digital to analog converter 71 and analog switch 114 to an input of summing junction 97. The average phase voltage from filter 110 is connected through analog switch 115 with another input of summing junction 97. The output of summing junction 97 is connected through a filter 116 with the pulse width modulator 98 and output amplifier 99 of FIG. 3 to provide a regulated current to the exciter field.

The microprocessor has additional inputs representing the highest phase current 120, highest phase voltage 121 and lowest phase voltage 122. These afford additional modes of operation of the voltage regulator to accommodate abnormal conditions. The high phase current and a function of the highest phase voltage, established by function block 123, are summed at junction 124, providing a field winding current limit of the character described in Dhyanchand et al. U.S. Pat. No. 4,044,296, connected through logic 113 with the digital to analog converter 71 and summing junction 97. Reference may be had to this patent for a further description of the nature of the field current limit.

In the event of a single phase fault in the generator, the average phase signal from filter 110 includes harmonics which should not be coupled to the exciter field current control. This condition also results in a high phase current detected by comparator 126 which provides a mode control signal to open analog switch 115. This removes the average voltage input from summer 97. The system continues to function with the voltage error from summer 125 controlling the field current.

In the event one phase voltage is low, the regulator will try to establish an excessive field current. This condition is sensed by comparing the highest phase voltage with a reference at summing junction 127 providing a signal to logic circuit 113 and limiting the control signal to the exciter field.

The highest phase voltage and lowest phase voltage are compared at summing junction 129. When the difference is excessive, comparator 130 has an output which opens analog switch 114 reducing the gain for the voltage error signal by connecting resistor 131 in the circuit. Logic circuit 113 responds to the output of comparator 130 connecting the output of summing junction 127 with digital to analog converter 71, and summing junction 97. This prevents the regulator from attempting to establish an excessive field current.

We claim:

1. In an electrical generating system with a multiphase generator having a field circuit and a source of current for said field circuit, a voltage regulator, comprising:
    a source of signal representing average generator phase output voltage;
    means for comparing said average output voltage signal with a reference and for generating a signal representing a voltage error;
    means for adding said average output voltage signal to said error signal;
    means responsive to the sum of said signals for controlling the current from said current source to said generator field; and
    means responsive to a generator phase fault for blocking said average output voltage signal from said adding means.

2. The voltage regulator of claim 1, including:
    means for sensing the level of the high phase current; and
    means responsive to an excessive phase current for blocking the average output voltage signal to the adding means.

3. The voltage regulator of claim 2 in which:
    the means for adding the average and error signals is a summer having inputs for each of said signals and including:
    a switch connected between the source of average voltage output signal and the summer input;
    a microprocessor having a high phase current input;
    means in said microprocessor responsive to a high phase current in excess of a selected level for generating a control signal; and
    means responsive to said control signal to open said switch upon the occurrence of an excessive phase current.

4. In an electrical generating system with a multiphase generator having a field circuit and a source of current for said field circuit, a voltage regulator, comprising:
    a source of signal representing average generator phase output voltage;
    means for comparing said average output voltage signal with a reference for generating a signal representing a voltage error;
    a circuit responsive to said error signal for controlling the current to said generator field; and
    means responsive to an excessive phase voltage difference for reducing the gain of the circuit of the voltage error signal.

5. The voltage regulator of claim 4 including:
    a microprocessor having phase voltage inputs;
    means in said microprocessor for subtracting the low phase voltage from the high phase voltage to establish a phase voltage difference;
    means in said microprocessor responsive to a phase voltage difference in excess of a selected level for reducing the error signal circuit gain.

* * * * *